(12) United States Patent
Sakakibara

(10) Patent No.: US 9,735,697 B2
(45) Date of Patent: Aug. 15, 2017

(54) CONTROL METHOD FOR DIRECT POWER CONVERTER

(71) Applicant: DAIKIN INDUSTRIES, LTD., Osaka-shi, Osaka (JP)

(72) Inventor: Kenichi Sakakibara, Kusatsu (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 0 days.

(21) Appl. No.: 15/024,218

(22) PCT Filed: Aug. 27, 2014

(86) PCT No.: PCT/JP2014/072389
§ 371 (c)(1),
(2) Date: Mar. 23, 2016

(87) PCT Pub. No.: WO2015/045714
PCT Pub. Date: Apr. 2, 2015

(65) Prior Publication Data
US 2016/0233782 A1 Aug. 11, 2016

(30) Foreign Application Priority Data
Sep. 24, 2013 (JP) .................................. 2013-196891

(51) Int. Cl.
*H02M 1/08* (2006.01)
*H02M 5/458* (2006.01)
(Continued)

(52) U.S. Cl.
CPC ............. *H02M 5/458* (2013.01); *H02M 1/42* (2013.01); *H02M 1/4225* (2013.01); *H02J 7/345* (2013.01);
(Continued)

(58) Field of Classification Search
CPC .............................. H02M 1/08; H02M 5/548
(Continued)

(56) References Cited

U.S. PATENT DOCUMENTS

2015/0244282 A1* 8/2015 Yamashita .......... H02M 1/4225
363/35
2015/0280601 A1* 10/2015 Sakakibara ............. H02M 1/15
363/37

(Continued)

FOREIGN PATENT DOCUMENTS

| JP | 2011-193678 A | 9/2011 |
|---|---|---|
| JP | 2012-135184 A | 7/2012 |

OTHER PUBLICATIONS

Ohnuma et al., "Circuit Configuration and Control Strategy of single-to-three Phase Power Converter with Active Buffer and Charge Circuit," 2010 IEE Japan, 2010 Annual Meeting of the Institute of Electrical Engineers of Japan, No. 4-057, Mar. 17-19, 2010, pp. 95-96 (Total pp. 3).

(Continued)

*Primary Examiner* — Jeffrey Sterrett
(74) *Attorney, Agent, or Firm* — Birch, Stewart, Kolasch & Birch, LLP

(57) ABSTRACT

A converter performs full-wave rectification on a single-phase voltage, thus outputting a rectified voltage across DC power supply lines. An inverter receives the rectified voltage and then supplies a three-phase AC current to an inductive load. Between the DC power supply lines is connected a charge and discharge circuit. The charge and discharge circuit includes a buffer circuit and a boost circuit. The buffer circuit includes a series connection between a capacitor and a switch. The boost circuit, which may be configured by a boost chopper, includes a switch, a reactor and a diode. The charge and discharge circuit provides and receives part (Continued)

of pulsations of the power input to the converter between the DC power supply lines.

6 Claims, 8 Drawing Sheets

(51) Int. Cl.
*H02M 1/42* (2007.01)
*H02P 27/06* (2006.01)
*H02M 7/48* (2007.01)
*H02J 7/34* (2006.01)

(52) U.S. Cl.
CPC ............... *H02M 7/48* (2013.01); *H02P 27/06* (2013.01); *H02P 2201/09* (2013.01); *Y02B 40/90* (2013.01); *Y02B 70/126* (2013.01)

(58) Field of Classification Search
USPC ........................................ 363/34, 36, 37, 98
See application file for complete search history.

(56) References Cited

U.S. PATENT DOCUMENTS

| 2016/0233782 A1* | 8/2016 | Sakakibara | ......... H02M 1/4225 |
| 2016/0248335 A1* | 8/2016 | Sakakibara | ............. H02M 1/14 |
| 2016/0294300 A1* | 10/2016 | Sakakibara | ............. H02M 1/15 |

OTHER PUBLICATIONS

Ohnuma et al., "Comparison between a Boost Chopper and an Active Buffer as a Single to Three Phase Converter," 2011 IEE Japan, 2011 Annual Meeting of the Institute of Electrical Engineers of, Japan, No. 4-042, Mar. 16-18, 2011, pp. 80-81 (Total pp. 3).

Ohnuma et al., "Experimental Verification of Single Phase to Three Phase Converter Using an Active Buffer circuit with a Charge Circuit," 2010, IEE Japan, Industry Applications Society Conference, 1-124, pp. 587-590.

* cited by examiner

F I G. 2
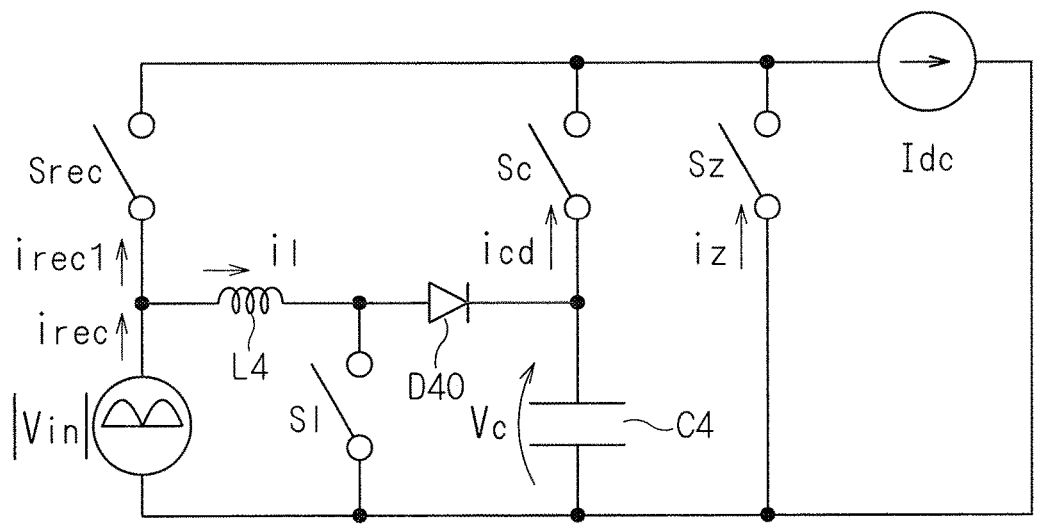

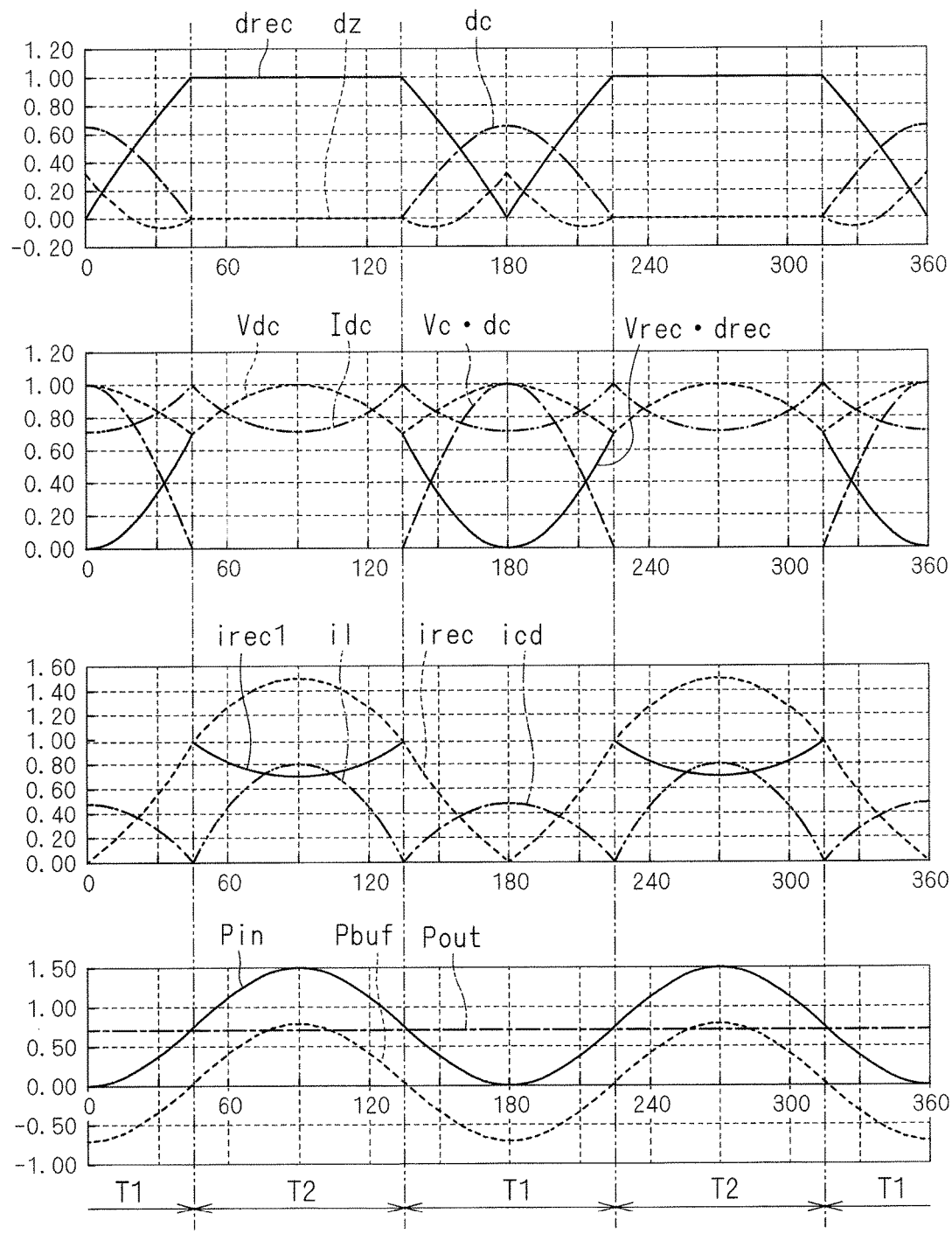
F I G. 5

CONTROL METHOD FOR DIRECT POWER CONVERTER

TECHNICAL FIELD

The present disclosure relates to a method for controlling a direct power converter.

BACKGROUND ART

Japanese Patent Application Laid-Open No. 2011-193678; Japanese Patent Application Laid-Open No. 2012-135184; Yoshiya Ohnuma, Jun-ichi Itoh, "Circuit Configuration and Control Strategy of single-to-three Phase Power Converter with Active Buffer and Charge Circuit", The 2010 Annual Meeting of the Institute of Electrical Engineers of Japan, No. 4-057 (2010); Yoshiya Ohnuma, Jun-ichi Itoh, "Experimental Verification of Single Phase to Three Phase Converter Using an Active Buffer circuit with a Charge Circuit", 2010 IEEJ Industry Applications Society Conference 1-124 (2010); and Yoshiya Ohnuma, Jun-ichi Itoh, "Comparison of Boost Chopper and Active Buffer as Single to Three Phase Converter", The 2011 Annual Meeting of the Institute of Electrical Engineers of Japan, No. 4-042 (2011) each describe a direct power converter. The direct power converter includes a diode rectifier, an inverter and a charge and discharge circuit.

A single-phase AC voltage is full-wave rectified by the diode rectifier, is thus output to a pair of DC power supply lines (a DC link).

The charge and discharge circuit is provided in the DC link and includes a buffer circuit and a boost circuit. The buffer circuit includes a switch and a capacitor connected in series with each other between the pair of DC power supply lines. The capacitor is discharged by conduction of the switch, thus providing power to the DC link.

The boost circuit boosts a rectified voltage from the diode rectifier to charge the capacitor. The charge and discharge circuit accordingly receives power from the DC link. The inverter receives a DC voltage of the DC link and converts it into an AC voltage to be output.

SUMMARY OF INVENTION

Problem to be Solved by the Invention

Unfortunately, the charge and discharge circuits proposed in these documents require high power capacity to compensate for the pulsating components of a single-phase AC voltage.

Typical electrolytic capacitors allow only a small ripple current, although they are inexpensive. Thus, the capacitor of the charge and discharge circuit proposed above is desirably, for example, a film capacitor or a laminated ceramic capacitor as in Yoshiya Ohnuma, Jun-ichi Itoh, "Comparison of Boost Chopper and Active Buffer as Single to Three Phase Converter", The 2011 Annual Meeting of the Institute of Electrical Engineers of Japan, No. 4-042 (2011). From such a point of view, it is difficult to configure a charge and discharge circuit inexpensively.

This application therefore has an object to provide a technique of reducing power provided/received between a charge and discharge circuit and a DC link to reduce power capacity required for the charge and discharge circuit.

Means to Solve the Problem

A method for controlling a direct power converter according to the present disclosure is a method for controlling a direct power converter including: a first power supply line (LH); a second power supply line (LL) which is applied with a potential lower than that of the first power supply line is applied; a converter (3) including an input side connected with a single-phase AC power supply (1, 2) and an output side connected with the first power supply line and the second power supply line, and performing single-phase full-wave rectification; a charge and discharge circuit (4) located between the first power supply line and the second power supply line; and an inverter (5) that converts a DC voltage between the first power supply line and the second power supply line into an AC voltage.

In the direct power converter, the charge and discharge circuit includes: a buffer circuit (4a) including a capacitor (C4) and a first switch (Sc, D42) connected in series with the capacitor at a side close to the first power supply line between the first power supply line and the second power supply line, and providing and receiving power between the first power supply line and the second power supply line; and a boost circuit (4b) that boosts a rectified voltage (Vrec) from the converter (3) to charge the capacitor.

The buffer circuit (4a) provides power to the first power supply line and the second power supply line in a first period (T1) in which a cosine value (cos(2 ωt)) to a value (2 ωt) of twice a phase angle (ωt) of an AC waveform output from the single-phase AC power supply (1, 2) is positive when the AC waveform is regarded as a sine value (sin(ωt)) of the phase angle (ωt); receives power from the first power supply line and the second power supply line in a second period (T2) in which the cosine value is negative.

The converter (3) is conductive at a rectifying duty (drec), where the rectifying duty takes a value of $\sqrt{2}$-times an absolute value (|sin(ωt)|) of the sine value in the first period.

A first aspect of the control method determines power (Vdc·Idc) input to the inverter (5) as a product of an absolute value (Im/$\sqrt{2}$) of an input current input to the converter (3) at a boundary between the first period and the second period, an effective value (Vm/$\sqrt{2}$) of an AC voltage (Vin) of the single-phase AC power supply, and a value ((1−(1−k)·cos (2ωt)) obtained by subtracting, from one, a value obtained by multiplying the cosine value (cos(2ωt)) by a positive constant (1−k) less than one.

In a second aspect of the method for controlling a direct power converter according to the present disclosure, in the first aspect, the rectifying duty (drec) takes an inverse number (1/($\sqrt{2}$|sin(ωt)|)) of the value of $\sqrt{2}$-times the absolute value (|sin(ωt)|) of the sine value in the second period (T2). The first switch (Sc, D42) is rendered conductive to discharge the capacitor (C4) in the first period (T1) at a discharge duty (dc) taking a value obtained by dividing, by $\sqrt{2}$, a product of the cosine value (cos(2ωt)) and a value (Vm/Vc) obtained by dividing a crest value (Vm) of the AC voltage (Vin) of the single-phase AC power supply by a both-end voltage (Vc) of the capacitor.

In a third aspect of the method for controlling a direct power converter according to the present disclosure, in the first aspect, the rectifying duty (drec) takes a value 1 in the second period (T2). The first switch (Sc, D42) is rendered conductive to discharge the capacitor (C4) in the first period (T1) at a discharge duty (dc) taking a product of the cosine value (cos(2ωt)) and a value (Vm/Vc) obtained by dividing a crest value (Vm) of the AC voltage (Vin) of the single-phase AC power supply by a both-end voltage (Vc) of the capacitor.

For example, the boost circuit (4b) includes: a diode (D40) including an anode and a cathode that is connected between the first switch (Sc, D42) and the capacitor (C4); a reactor (L4) connected between the first power supply line (LH) and the anode, through which a current input to the boost circuit flows; and a second switch (S1, D41) connected between the second power supply line (LL) and the anode.

In the second period (T2), the second switch of the boost circuit is controlled to control a current (il) flowing through the reactor (L4).

Effects of the Invention

According to the first aspect of the method for controlling a direct power converter of the present disclosure, the power provided/received by the buffer circuit is reduced, thereby reducing a power capacity required for the buffer circuit.

According to the second aspect of the method for controlling a direct power converter of the present disclosure, an average value of a virtual DC voltage can be made constant in a period in which the inverter is capable of power conversion.

According to the third aspect of the method for controlling a direct power converter of the present disclosure, a voltage utilization ratio can be improved.

The object, features, aspects and advantages of the present disclosure will become more apparent from the following detailed description and the attached drawings.

BRIEF DESCRIPTION OF DRAWINGS

FIG. 2 is a circuit diagram showing an equivalent circuit of a circuit shown in FIG. 1;

FIGS. 5 and 6 are graphs showing the operation of the direct power converter shown in FIG. 1 in second setting;

DESCRIPTION OF EMBODIMENTS

A. Configuration of Direct Power Converter

Figure 1:
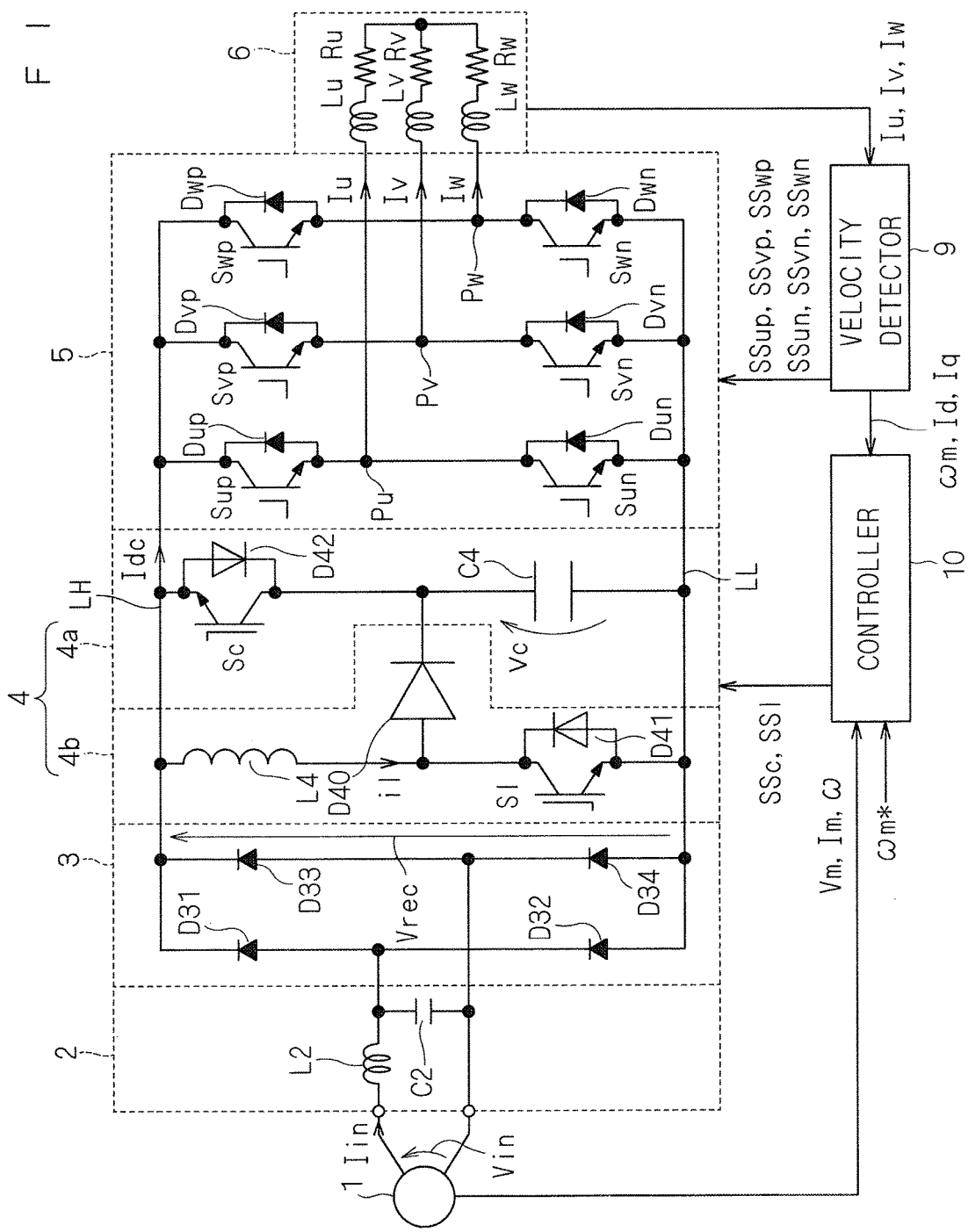
FIG. 1 is a block diagram showing the configuration of a direct power converter to which a control method described in an embodiment is applied.

FIG. 1 is a block diagram showing the configuration of a direct power converter to which a control method described in this embodiment is applied. The direct power converter includes a converter 3, a charge and discharge circuit 4 and an inverter 5.

The converter 3 is connected with a single-phase AC power supply 1 via, for example, a filter 2. The filter 2 includes a reactor L2 and a capacitor C2. The reactor L2 is provided between the converter 3 and one of two output terminals of the single-phase AC power supply 1. The capacitor C2 is provided between the two output terminals of the single-phase AC power supply 1. The filter 2 removes the high frequency components of a current. The filter 2 may be omitted. For the sake of brevity, the following description will be made ignoring the function of the filter 2.

The converter 3 uses a diode bridge, for example, and includes diodes D31 to D34. The diodes D31 to D34, which constitute a bridge circuit, convert a single-phase AC voltage Vin, which is an input voltage input from the single-phase AC power supply 1, by single-phase full-wave rectification and output it across power supply lines LH and LL (which form a so-called DC link). A higher potential is applied to the DC power supply line LH than to the DC power supply line LL. An input current Iin flows into the converter 3 from the single-phase AC power supply 1.

The charge and discharge circuit 4 includes a buffer circuit 4a and a boost circuit 4b. The buffer circuit 4a includes a capacitor C4 and provides and receives power between the DC power supply lines LH and LL. The boost circuit 4b boosts the rectified voltage Vrec to charge the capacitor C4.

The buffer circuit 4a further includes a transistor (herein an insulated gate bipolar transistor, abbreviated as "IGBT" below) Sc connected in antiparallel with a diode D42. The transistor Sc is connected in series with the capacitor C4 at the side close to the DC power supply line LH between the DC power supply lines LH and LL. Herein, being connected in antiparallel refers to being connected in parallel, with forward directions being opposite to each other. Specifically, the forward direction of the transistor Sc is a direction from the DC power supply line LL toward the DC power supply line LH, and the forward direction of the diode D42 is a direction from the DC power supply line LH toward the DC power supply line LL. The transistor Sc and the diode D42 can be collectively regarded as a switch element (first switch).

The boost circuit 4b includes, for example, a diode D40, a reactor L4 and a transistor (herein, IGBT) S1. The diode D40 has a cathode and an anode, and the cathode is connected between the first switch and the capacitor C4. This configuration is known as a so-called boost chopper.

The reactor L4 is connected between the DC power supply line LH and the anode of the diode D40. The transistor S1 is connected between the DC power supply line LL and the anode of the diode D40. The transistor S1 is connected in antiparallel with the diode D41, which are collectively regarded as a switch element (second switch).

The capacitor C4 is charged by the boost circuit 4b, thus generating a both-end voltage Vc higher than the rectified voltage Vrec. Specifically, a current is caused to flow from the DC power supply line LH to the DC power supply line LL via the second switch to store energy in the reactor L4, and then, the second switch is turned off to store the energy in the capacitor C4 via the diode D40.

The both-end voltage Vc is higher than the rectified voltage Vrec, and thus, basically no current flows through the diode D42. Thus, the conduction/non-conduction of the first switch solely depends on that of the transistor Sc. Hereinafter, accordingly, not only the transistor Sc but also the first switch including the transistor Sc and the diode D42 may be referred to as a switch Sc.

The power supply line LH is higher than the DC power supply line LL in potential, and thus, basically no current flows through the diode D41. Thus, the conduction/non-conduction of the second switch solely depends on that of the transistor S1. Hereinafter, accordingly, not only the transistor S1 but also the second switch including the transistor S1 and the diode D41 may be referred to as a switch S1.

The inverter 5 converts a DC voltage between the DC power supply lines LH and LL into an AC voltage and then outputs it to output terminals Pu, Pv and Pw. The inverter 5 includes six switching elements Sup, Svp, Swp, Sun, Svn and Swn. The switching elements Sup, Svp and Swp are respectively connected between the output terminals Pu, Pv and Pw and the DC power supply line LH. The switching elements Sun, Svn and Swn are respectively connected between the output terminals Pu, Pv and Pw and the DC power supply line LL. The inverter 5 constitutes a so-called voltage source inverter and includes six diodes Dup, Dvp, Dwp, Dun, Dvn and Dwn.

The diodes Dup, Dvp, Dwp, Dun, Dvn and Dwn are disposed, with their cathodes toward the DC power supply line LH and their anodes toward the DC power supply line LL. The diode Dup is connected in parallel with the switching element Sup between the output terminal Pu and the DC power supply line LH. Similarly, the diodes Dvp, Dwp, Dun, Dvn and Dwn are respectively connected in parallel with the switching elements Svp, Swp, Sun, Svn and Swn.

For example, the switching elements Sup, Svp, Swp, Sun, Svn and Swn may use IGBTs.

An inductive load 6 is a rotating machine, for example, and is illustrated as an equivalent circuit indicative of an inductive load. Specifically, a reactor Lu and a resistor Ru are connected in series with each other, and one end of the series body is connected with the output terminal Pu. This holds true for a reactor Lv and a resistor Rv and for a reactor Lw and a resistor Rw. The other ends of the series bodies are connected with each other.

B. Control Method (b-1) Basic Concept of Power Reduction

An instantaneous input power Pin input to the converter 3 is expressed by the following formula with an input power factor being one, where a crest value Vm and a power supply angular velocity ω of the single-phase AC voltage Vin, a crest value Im of the input current Iin, and a time t are introduced. A product ωt of the power supply angular velocity ω and the time t represents a phase angle of the single-phase AC voltage Vin. An AC waveform is regarded as the product of a sine value of the phase angle wt of the AC waveform and a crest value.

$$Pin = Vm \cdot Im \cdot \sin^2(\omega t) \qquad (1)$$
$$= \frac{1}{2}Vm \cdot Im - \frac{1}{2}Vm \cdot Im \cdot \cos(2\omega t)$$

The second term of the right-hand side of the formula (1) represents power pulsations. In conventional techniques, to cancel out such power pulsations, the buffer circuit 4a provides and receives, between the DC power supply lines LH and LL therewith, the power that has the same value as that of the second term of the right-hand side of the formula (1) and has an opposite polarity. The power capacity of the charge and discharge circuit 4 therefore needs to be selected so as to be greater than or equal to the second term of the right-hand side of the formula (1).

Description will thus be made on which technique should be used for allowing to reduce the power (hereinafter referred to as "instantaneously provided/received power Pbuf") provided/received as described above in order to reduce the power capacity of the charge and discharge circuit 4.

Needless to say, setting the instantaneously provided/received power Pbuf to completely zero is not desirable because the power input to the inverter 5 pulsates with the second term of the right-hand side of the formula (1) and, in the first place, reducing the power capacity of the charge and discharge circuit 4 is not required. A positive constant k less than one is thus introduced (a value (1−k) is accordingly also a positive constant less than one) to determine the instantaneously provided/received power Pbuf by the following formula. In other words, a characteristic approach for achieving such instantaneously provided/received power Pbuf will be described below.

$$Pbuf = \frac{1}{2}Vm \cdot Im \cdot \cos(2\omega t) \cdot k \qquad (2)$$

That is to say, the instantaneously provided/received power Pbuf is represented as the product of a DC component (Vm·Im/2) of the instantaneous power input from the single-phase AC power supply 1 (or further via the filter 2, which holds true for the description below), a cosine value cos (2ωt) to a value (2ωt) of twice a phase angle ωt and a constant k.

The instantaneously provided/received power Pbuf specifically takes a positive value in a period (hereinafter a "providing period") in which the phase angle ωt of the single-phase AC voltage is 0 or more and π/4 or less, 3π/4 or more and 5π/4 or less, or 7π/4 or more and 2π or less, and takes a negative value in any other period (hereinafter a "receiving period"). That is to say, the buffer circuit 4a provides an absolute value of the instantaneously provided/received power Pbuf to the DC power supply lines LH and LL in the providing period and receives the absolute value of the instantaneously provided/received power Pbuf from the DC power supply lines LH and LL in the receiving period. The power pulsations are accordingly canceled out.

The single-phase AC voltage Vin is represented as Vm·sin (ωt), and thus, to put the above range in another way, the charge and discharge circuit 4 outputs positive power when the absolute value of the single-phase AC voltage Vin is smaller than a value of $1/\sqrt{2}$ times the crest value Vm and outputs negative power when the absolute value is greater than the value of $1/\sqrt{2}$-times the crest value Vm.

FIG. 2 shows an equivalent circuit of the circuit shown in FIG. 1 described with reference to Japanese Patent Application Laid-Open No. 2011-193678 and Yoshiya Ohnuma, Jun-ichi Itoh, "Circuit Configuration and Control Strategy of single-to-three Phase Power Converter with Active Buffer and Charge Circuit", The 2010 Annual Meeting of the Institute of Electrical Engineers of Japan, No. 4-057 (2010) (hereinafter referred to as a "first document group"). In the equivalent circuit shown in FIG. 2, a current irec1 flowing from the converter 3 to the inverter 5 is equivalently expressed as a current irec1 flowing through a switch Srec when the switch Srec is conductive. Similarly, the discharge current of the capacitor C4 is equivalently shown as a current icd through the switch Sc when the switch Sc is conductive. Also, a current, which flows through the inductive load 6 via the inverter 5 when the output terminals Pu, Pv and Pw are connected in common to any one of the DC power supply lines LH and LL in the inverter 5, is equivalently expressed as a zero-phase current iz flowing through a switch Sz when the switch Sz is conductive. FIG. 2 also shows the reactor L4, the diode D40 and the switch S1 constituting the boost circuit 4b, and additionally shows a current it flowing through the reactor L4.

Duties drec, dc and dz at which the switches Srec, Sc and Sz are respectively conductive and a DC current Idc input to the inverter 5 are introduced in the equivalent circuit thus obtained, and accordingly, the following formula holds.

$$\begin{bmatrix} irec \\ icd \\ iz \end{bmatrix} = \begin{bmatrix} drec & 1 \\ dc & 0 \\ dz & 0 \end{bmatrix} \cdot \begin{bmatrix} Idc \\ i1 \end{bmatrix} \quad (3)$$

The currents irec1, icd and iz are obtained by multiplying the DC current Idc respectively by the duties drec, dc and dz, and thus, these are respectively average values in the switching cycles of the switches Srec, Sc and Sz. The current il is also an average value in the switching cycle of the switch S1.

The DC current Idc is the sum of the currents irec1, icd and iz flowing through the respective switches Srec, Sc and Sz, and thus, the following equation holds, where $0 \leq drec1$, $0 \leq dc \leq 1$ and $0 \leq dz \leq 1$.

$$drec + dc + dz = 1 \quad (4)$$

The duties drec, dc and dz are thus considered as current distribution ratios of the DC current Idc to the respective currents irec1, icd and iz. The duty drec is a duty at which a period, in which the converter 3 is connected with the DC power supply lines LH and LL and allows a current to flow into the inverter 5, is set, and thus may be referred to as a rectifying duty drec below. The duty dc is a duty at which the capacitor C4 is discharged, and thus may be referred to as a discharge duty dc below. The duty dz is a duty at which the zero-phase current iz always flows in the inverter 5 irrespective of the voltage output by the inverter 5, and thus may be referred to as a zero duty dz below.

The inverter 5 cannot utilize a DC voltage between the DC power supply lines LH and LL in the period in which a zero-phase current iz flows. Of the DC voltage between the DC power supply lines LH and LL, thus, a virtual DC voltage (hereinafter referred to as a "virtual DC voltage") Vdc in a period in which the inverter 5 is capable of power conversion is conceivable as follows. The virtual DC voltage Vdc can be regarded as a voltage applied across the DC power supply lines LH and LL as an average of the maximum values of the voltages that can be output by the inverter 5, with respect to the cycle of controlling switching of the switches Sc and S1 and the inverter 5.

$$Vdc = Vrec \cdot drec + Vc \cdot dc + 0 \cdot dz$$

where $Vrec = Vm \cdot |\sin(\omega t)|$ \quad (5)

Hereinafter, a ratio R Vdc/Vm) of a virtual DC voltage Vdc to a crest value Vm is referred to as a voltage utilization ratio.

(b-2) First Setting of Duty for Maximizing Voltage Utilization Ratio R

According to the first document group, the rectifying duty drec and the discharge duty dc for maximizing the voltage utilization ratio R are each set in the providing period and the receiving period by the formulas (6) and (7), respectively. As suggested in Japanese Patent Application Laid-Open No. 2011-193678, however, this is the setting that maximizes a voltage utilization ratio R for the virtual DC voltage Vdc that is constant. The voltage utilization ratio R is $(1/\sqrt{2})$ in this case. In the receiving period, dc=0, so that the switch Sc is not conductive. In the providing period, the capacitor C4 is not charged, so that the current il does not flow.

$$drec = \sqrt{2} |\sin(\omega t)| \\ dc = \frac{Vm}{vc} \cdot \frac{\cos(2\omega t)}{\sqrt{2}} \quad (6)$$

$$drec = \frac{1}{\sqrt{2} |\sin(\omega t)|} \\ dc = 0 \quad (7)$$

In the "first setting", the DC current Idc input to the inverter 5 is caused to pulsate with the voltage utilization ratio R above kept, that is, the duties of the formulas (6) and (7) kept, thus obtaining an instantaneously provided/received power Pbuf that satisfies the formula (2).

Specifically, the DC current Idc that satisfies the following formula is caused to be input to the inverter 5. The control of the converter 5 for satisfying the following formula can be achieved by controlling a current command value. The control of the current command value will be described below.

$$Idc = \frac{Vm \cdot Im}{2Vdc}(1 - (1-k) \cdot \cos(2\omega t)) \quad (8)$$

In the providing period, the current il is set to zero as described above, so the current irec is equal to the current irec1, and the current irec is equal to the product drec·idc. The following formula therefore holds, where $Vm/Vdc = \sqrt{2}$ is adopted in view of the voltage utilization ratio R.

$$irec = irec1 = drec \cdot Idc \quad (9)$$
$$= \sqrt{2} |\sin(\omega t)| \cdot \frac{Vm}{2Vdc} \cdot Im(1 - (1-k) \cdot \cos(2\omega t))$$
$$= Im|\sin(\omega t)| \cdot (1 - (1-k) \cdot \cos(2\omega t))$$

Since the current irec appears as the absolute value of the input current Iin, as opposed to the technique described in the first document group (hereinafter referred to as a "basic technique"), the input current Iin differs from a sinusoidal current. In this embodiment (including not only the "first setting" but also the "second setting", which holds true for the description below), thus, the crest value Im is a crest value of the current that shows a sine wave and has an effective value of the input current Iin (i.e., a time average of the powers of the input current Iin) as an effective value.

In the formula (9), regardless of the value of k, $|\sin(\omega t)|=1/\sqrt{2}$ and the current irec takes a value $Im/\sqrt{2}$ when $\cos(2\omega t)=0$. In this embodiment, accordingly, the crest value Im of the current irec can be regarded as being $\sqrt{2}$ times a value of the current irec (i.e., an absolute value of the current Iin) when the phase angle $\omega t$ is $\pi/4$ and $3\pi/4$ (i.e., a boundary between the providing period and the receiving period).

From the formula (9), the power input from the single-phase AC power supply 1 in the providing period can be obtained by the formula (10).

$$Pin = Vm \sim Im \cdot \sin^2(\omega t) \cdot (1-(1-k) \cdot \cos(2 \cdot t)) \quad (10)$$

The power input to the inverter 5, that is, instantaneous output power Pout consumed by the inverter 5 is obtained as the product of the DC current Idc and the virtual DC voltage Vdc, which is obtained by the formula (11).

$$P_{out} = V_{dc} \cdot I_{dc} \quad (11)$$

$$= \frac{Vm \cdot \mathrm{Im}}{2}(1 - (1-k) \cdot \cos(2\omega t))$$

A difference between the formulas (10) and (11) is thus obtained as being expressed by the formula (12), which matches the formula (2).

$$P_{out} - P_{in} = \frac{Vm \cdot \mathrm{Im}}{2}[(1-(1-k)\cdot\cos(2\omega t)) - 2\sin^2(\omega t)] \quad (12)$$

$$= \frac{Vm \cdot \mathrm{Im}}{2} \cdot \cos(2\omega t) \cdot k$$

The validity of setting the DC current Idc by the formula (8) has therefore been described.

In the receiving period, the current il is set as being expressed by the formula (13). The power stored in the charge and discharge circuit 4 in the receiving period is accordingly calculated as the formula (14), and is equal in an absolute value to and a polarity opposite to those of the formula (2) expressing the instantaneously provided/received power Pbuf. The validity of setting the current il by the formula (13) is therefore revealed.

$$i1 = k \cdot \mathrm{Im} \cdot \left[|\sin(\omega t)| - \frac{1}{2|\sin(\omega t)|}\right] \quad (13)$$

$$|Vin| \cdot i1 = Vm|\sin(\omega t)| \cdot k \cdot \mathrm{Im} \cdot \left[|\sin(\omega t)| - \frac{1}{2|\sin(\omega t)|}\right] \quad (14)$$

$$= Vm \cdot \mathrm{Im} \cdot k \cdot \left[\sin^2(\omega t) - \frac{1}{2}\right]$$

$$= \frac{1}{2} Vm \cdot \mathrm{Im} \cdot k \cdot [-\cos(2\omega t)]$$

The above reveals that when control is being performed so that the rectifying duty drec expressed by the formula (6) is satisfied to cause the current irec1 to flow from the converter 3 to the inverter 5 in the providing period, further performing control below can reduce the instantaneously provided/received power Pbuf to k-times in the basic technique.

(i) The inverter 5 is caused to receive the current Idc that satisfies the formula (8).

(ii) The current il that satisfies the formula (13) is input to the buffer circuit 4a in the receiving period.

A specific approach for (i) above will be described in "(b-4)" below. A specific operation of the boost circuit 4b for (ii) above can be achieved easily based on the first document group. That is to say, a conduction duty dl at which the switch S1 is conductive is obtained by multiplying the value of the conduction duty dl described in the basic technique by $\sqrt{k}$.

As in the basic technique, for the voltage utilization ratio R to take its maximum value ($1/\sqrt{2}$) with the virtual DC voltage Vdc kept constant, in the providing period, further, (iv) the switch Sc is rendered conductive at the discharge duty dc that satisfies the formula (6) to discharge the capacitor C4, and (v) the converter 3 operates at the rectifying duty drec expressed by the formula (6).

In actuality, however, the switch Srec is not provided and merely appears in the equivalent circuit. That is to say, conduction/non-conduction of the switch Srec is determined dependent on the operations of the switch Sc and the inverter 5. That is to say, in view of the formula (4), conduction/non-conduction of the switch Sc is individually controlled at the discharge duty dc and the switching of the inverter 5 is controlled at the zero duty dz (i.e., a zero-phase current flows in the period equivalent to the zero duty dz, irrespective of the voltage output from the inverter 5) in accordance with the formula (15) in the providing period and the formula (16) in the receiving period, thus achieving a rectifying duty drec. Also in this case, the switch Sci is not conductive in the receiving period.

$$\left. \begin{array}{l} dc = \dfrac{Vm}{vc} \cdot \dfrac{\cos(2\omega t)}{\sqrt{2}} \\ dz = 1 - dc - \sqrt{2}\,|\sin(\omega t)| \end{array} \right\} \quad (15)$$

$$\left. \begin{array}{l} dc = 0 \\ dz = 1 - \dfrac{1}{\sqrt{2}\,|\sin(\omega t)|} \end{array} \right\} \quad (16)$$

More specific approaches for (iv) and (v) above are described in the first document group and are thus omitted herein.

Figure 3:
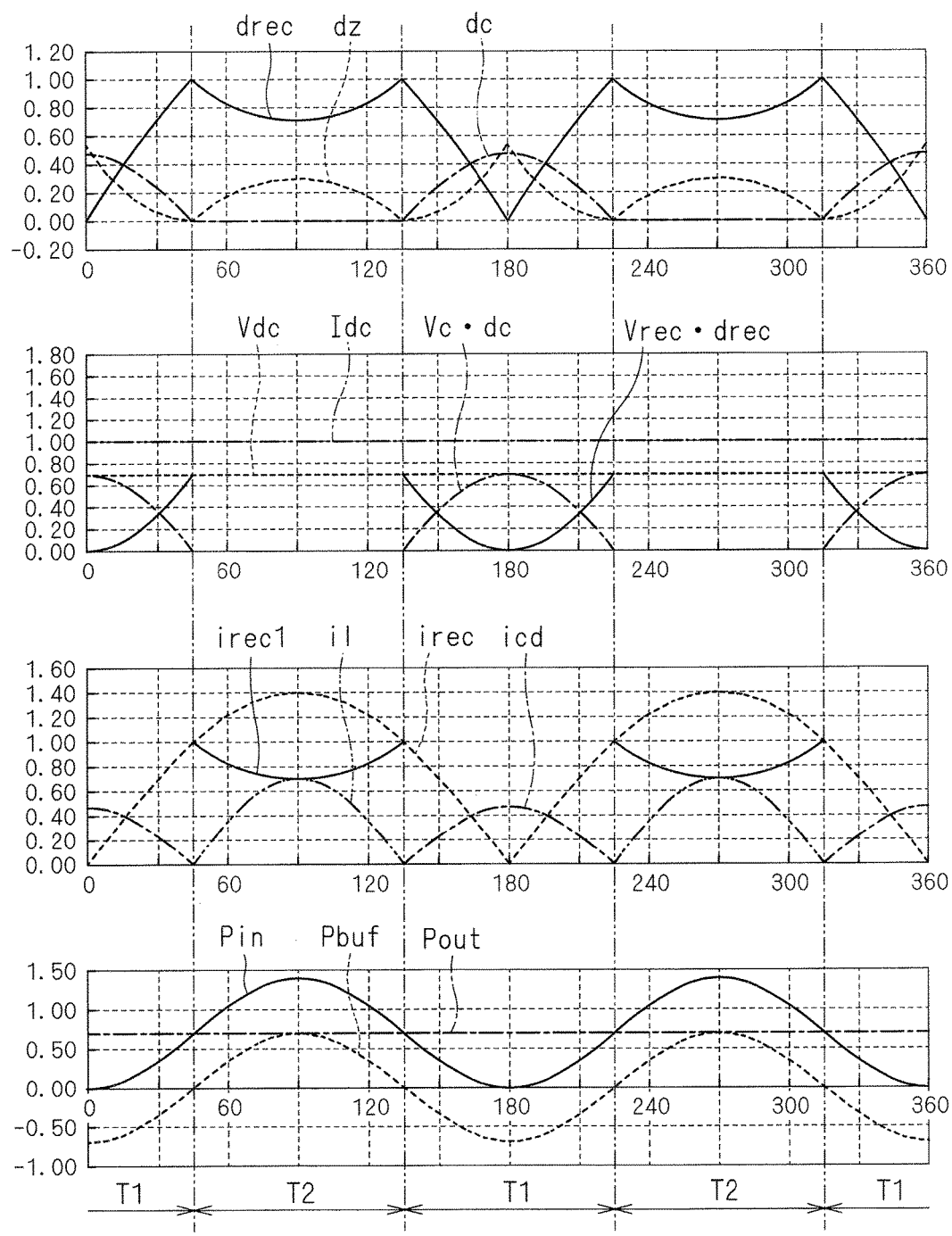
FIGS. 3 and 4 are graphs showing the operation of the direct power converter shown in FIG. 1 in first setting.
Figure 4:
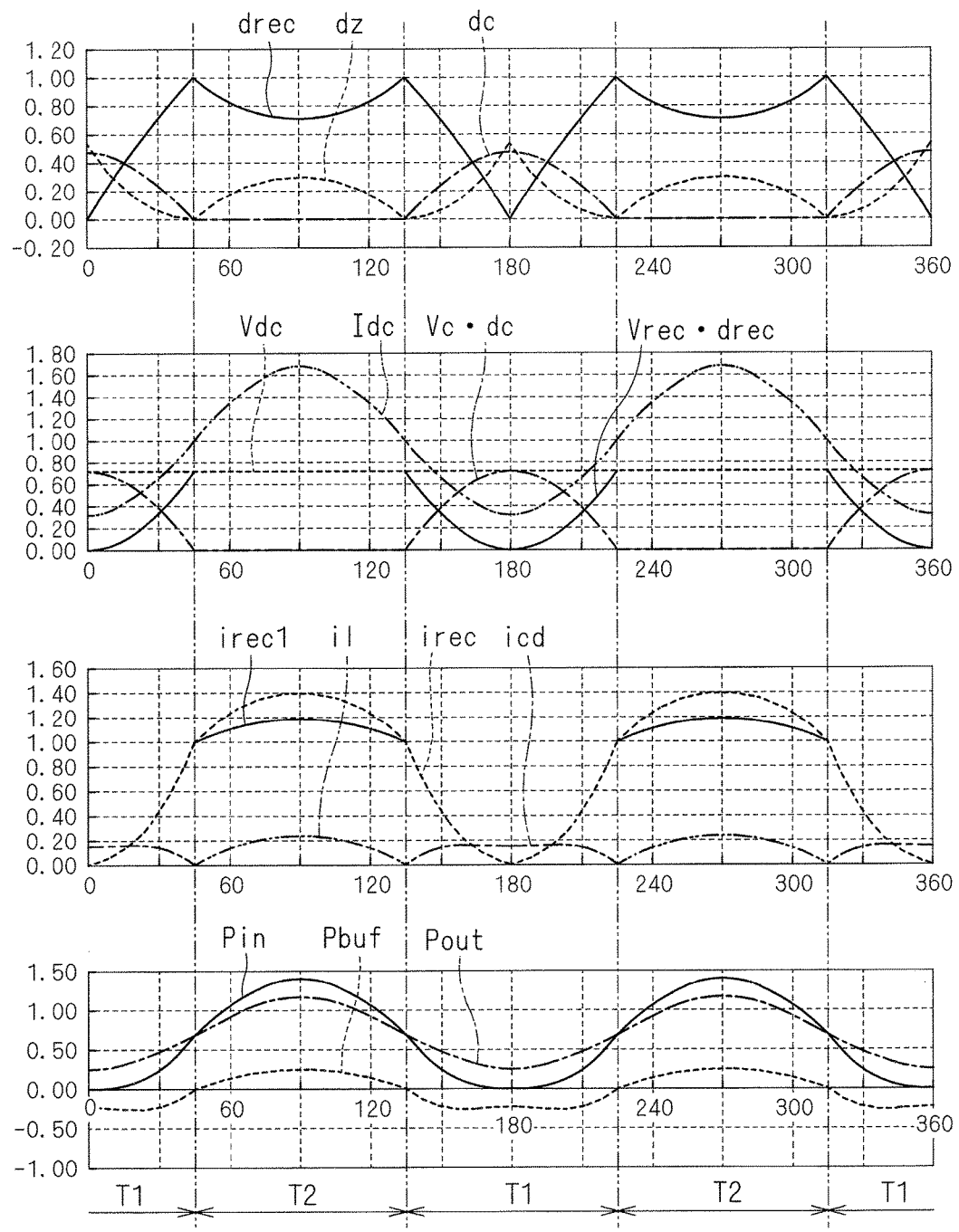

FIGS. 3 and 4 are graphs each showing the operation of the direct power converter shown in FIG. 1. FIG. 3 shows the case where the basic technique is employed, and FIG. 4 shows the case where (i) to (iv) are employed, where setting is made such that k=⅓. An equal voltage ratio Vc/Vm is set in FIGS. 3 and 4. The basic technique corresponds to the case where k=1 in the "first setting" (see the formulas (8) to (14)).

In both of FIGS. 3 and 4, the uppermost tier shows the duties drec, dc and dz, the second tier from the top shows the voltages Vrec·drec and Vc·dc, the virtual DC voltage Vdc which is constituted thereby (see the formula (5)), and the current Idc, the third tier from the top shows the currents irec, icd, il and irec1, and the lowermost tier shows the instantaneous powers Pin, Pout and Pbuf. Symbols T1 and T2 respectively represent the providing period and the receiving period.

In both of FIGS. 3 and 4, the horizontal axis represents the phase angle wt with "degree" as the unit. The currents Idc, irec, icd, il and irec1 are converted with the crest value Im being $\sqrt{2}$. The voltages Vrec, drec and Vc·dc are converted with the crest value Vm being one. The instantaneous powers Pin, Pout and Pbuf are each obtained as the product of the voltage and current converted as described above. The current il is zero in the providing period T1, and accordingly, the current irec1 matches the current irec; dc=0 in the receiving period T2, and accordingly, the voltage Vrec·drec matches the virtual DC voltage Vdc.

The duties drec, dc and dz are common in the basic technique and the first setting as described above, and thus, the voltages Vrec·drec, Vc·dc and the virtual DC voltage Vdc which is constituted thereby are common in the basic technique (see FIG. 3) and the first setting (see FIG. 4).

The current Idc is expressed by the formula (8), and accordingly, the basic technique shown in FIG. 3 (i.e., k=1) greatly differs from the technique of the "first setting" shown in FIG. 4 (herein, k=⅓).

It is revealed that the current il shown in the third tier from the top in each of FIGS. 3 and 4 is reduced more in the "first setting" than in the basic technique (see the formula (13) as well).

The current icd takes a value Idc·dc. The discharge duty dc is common and the current Idc is different in the basic technique and the "first setting". Specifically, the cosine value cos(2 ωt) is positive in the providing period in which the current icd flows, and the value (1−k) becomes greater with a smaller constant k, so as can be seen from the formula (8), the current Idc becomes smaller with a smaller constant k. That is to say, the current Idc is smaller in the providing period T1 in the "first setting" than in the basic technique. Similar to the current Idc, thus, the current icd reduces more in the technique of the "first setting" than in the basic technique.

Such reductions in the currents il and icd are desirable from the viewpoints of reducing power capacities required for the reactor L4 and the capacitor C4 employed in the charge and discharge circuit 4, scale and cost.

It is also revealed that the instantaneously provided/received power Pbuf is reduced more, in the technique of the "first setting" than in the basic technique, although the instantaneous input power Pin input is distorted more from the sine wave and the instantaneous output power Pout pulsates.

(b-3) Second Setting of Duty for Maximizing Voltage Utilization Ratio R

In the first setting, the instantaneous output power Pout pulsates along with the pulsation of the current Idc as described above. In this embodiment, to reduce the instantaneously provided/received power Pbuf, the pulsation of the instantaneous output power Pout is allowed. The technique of causing also the virtual DC voltage Vdc used by the inverter 5 to pulsate to improve a voltage utilization ratio R will be described in the "second setting".

Specifically, the waveform of the virtual DC voltage Vdc is set to be equal to the absolute value $Vm\cdot|\sin(\omega t)|$ of the input voltage Vin in the receiving period. This yields an average value Ra of the voltage utilization ratio R in the receiving period from the calculation of the formula (17), which is approximately 0.9. This can be considered as the voltage utilization ratio of the DC voltage input to the inverter 5, which is obtained by an average value with respect to the cycle of the single-phase AC voltage Vin.

$$Ra = \int_{\pi/4}^{3\pi/4} |\sin(\omega t)| \, d(\omega t)/(\pi/2) = \frac{2\sqrt{2}}{\pi} \quad (17)$$

Similarly, the waveform of the virtual DC voltage Vdc in the providing period is set by the formula (18).

$$Vdc = Vm \cdot |\cos(\omega t)| \quad (18)$$

That is to say, in the "second setting", the waveform of the virtual DC voltage Vdc is a waveform (hereinafter referred to as a "two-phase full-wave rectification waveform") obtained by performing full-wave rectification on a two-phase AC voltage having a crest value Vm.

There is a phase difference of π/2 between the providing period and the receiving period, and also, there is a phase difference of π/2 between the sine waveform and the cosine waveform. The average value Ra in the providing period is accordingly equal to that of the receiving period. The average value Ra can be thus obtained by the formula (17) in any of the providing period and the receiving period. This means that the average value Ra is improved to be $(2\sqrt{2}/\pi)/(1/\sqrt{2})=4/\pi$ times, that is, approximately 1.11 times that of the basic technique or the "first setting".

Not only the average value Ra but also the voltage utilization ratio R is improved per se compared with the basic technique or the "first setting", irrespective of the phase angle ωt. This is revealed from the fact that the virtual DC voltage Vdc, as it takes the two-phase full-wave rectification waveform whose minimum value is $Vm/\sqrt{2}$, is greater than or equal to a (constant) virtual DC voltage Vdc $(=Vm/\sqrt{2})$ obtained in the basic technique or the "first setting".

A specific approach for approximately making the waveform of the virtual DC voltage Vdc the two-phase full-wave rectification waveform will now be described. First, in the receiving period, the waveform of the virtual DC voltage Vdc is set to be equal to the absolute value of the input voltage Vin, so the rectifying duty drec should be set to one. More specifically, both of the discharge duty dc and the zero duty dz should be set to zero in view of the formula (4). That is to say, in the receiving period, the switch Sc is not conductive, and the inverter 5 can operate in response to requests for the currents Iu, Iv and Iw caused to flow into the inductive load 6 (without such a limitation to cause the zero-phase current iz to flow for setting a virtual DC voltage Vdc).

In the providing period, the rectifying duty drec is set similar to the "first setting", and the discharge duty dc is set to $\sqrt{2}$ times the value set in the "first setting". More specifically, the switch Sc should be switched at the discharge duty dc expressed by the formula (19) and the inverter 5 should be operated at the zero duty dz.

$$\left. \begin{array}{l} dc = \dfrac{Vm}{vc} \cdot \cos(2\omega t) \\ dz = 1 - dc - \sqrt{2}\,|\sin(\omega t)| \end{array} \right\} \quad (19)$$

The DC current Idc pulsates, and thus, Im/Idc does not have a constant value as in the basic technique. Even when the rectifying duty drec is set in the providing period as in the "first setting", however, the pulsation of the DC current Idc is small (a maximum value of pulsation is obtained by $1-1/\sqrt{2}$, which is approximately 30%) if k=1, and the rectifying duty drec is less than or equal to one. In the providing period, accordingly, |Iin|=irec=irec1=Idc·drec is little distorted.

The virtual DC voltage Vdc in the providing period can be thus obtained by the formula (20).

$$\begin{aligned} Vdc &= Vm \cdot \sqrt{2} \cdot \sin^2(\omega t) + Vm \cdot |\cos(2\omega t)| \\ &= \frac{Vm}{\sqrt{2}}\{1 + (\sqrt{2} - 1)|\cos(2\omega t)|\} \end{aligned} \quad (20)$$

The formula (20) is approximated closely to the formula (18) at the phase angles ωt of, for example, values 3π/4 to 5π/4 in the providing period. Specifically, it is revealed that there is a less than 1% difference between the value of integral of the virtual DC voltage Vdc expressed by the formula (18) over the providing period and the value of integral of the virtual DC voltage Vdc expressed by the formula (20) over the providing period.

The above reveals that by setting dc=dz=0 in the receiving period and using the duties expressed by the formula (19) in the providing period, the waveform of the virtual DC voltage Vdc can be approximated to a two-phase full-wave rectification waveform, thus improving the voltage utilization ratio R.

The DC current Idc set by the formula (8) is adopted also in the "second setting", so the formula (11) holds. That is to say, the right-hand side of the formula (11) needs to be obtained in the "second setting" as well as in the "first setting". Letting Vdc1 and Idc1 be the respective average values per cycle of the power supply phase of the virtual DC voltage Vdc and the DC current Idc in the "first setting", and letting Vdc2 and Idc2 be the respective average values per cycle of the power supply phase of the virtual DC voltage Vdc and the DC current Idc in the "second setting", the formula (21) holds.

$$Vdc1 \cdot Idc1 = Vdc2 \cdot Idc2 \qquad (21)$$

$Vdc1 = Vm/\sqrt{2}$ and $Vdc2 = (2\sqrt{2}/\pi)Vm$ in the description above, revealing a relationship $Idc2 = (\pi/4)Idc1$.

The current il in the "second setting" thus needs to be corrected, with respect to the current il in the "first setting" expressed by the formula (13), by a product $\pi/(2\sqrt{2})$ of a ratio $Idc2/Idc1 = \pi/4$ and a ratio $\sqrt{2}$ of the discharge duty dc in the "second setting" expressed by the formula (19) to the discharge duty dc in the "first setting" expressed by the formula (15). That is to say, the current il in the "second setting" is set by the formula (22).

$$il = k \cdot Im \cdot \left[ |\sin(\omega t)| - \frac{1}{2|\sin(\omega t)|} \right] \cdot \frac{\pi}{2\sqrt{2}} \qquad (22)$$

The above reveals that when control is being performed so that the rectifying duty drec expressed by the formula (6) is satisfied to cause the current irec1 to flow from the converter 3 to the inverter 5 in the providing period, further performing control below can increase a voltage utilization ratio while reducing the instantaneously provided/received power Pbuf.

(i) The inverter 5 is caused to receive the current Idc that satisfies the formula (8).

(iii) The current il that satisfies the formula (22) is input to the buffer circuit 4a in the receiving period.

In order to allow the pulsation of the virtual DC voltage Vdc utilized by the inverter 5 to further increase the voltage utilization ratio R, further, (vi) the switch Sc is rendered conductive at the discharge duty dc that satisfies the formula (19) to discharge the capacitor C4 in the providing period, and (vii) in the receiving period, not only the discharge duty dc but also the zero duty dz is set to zero, and the rectifying duty drec is set to one.

Specific approaches for (vi) and (vii) above can be achieved easily based on the first document group, which are omitted herein.

Figure 6:
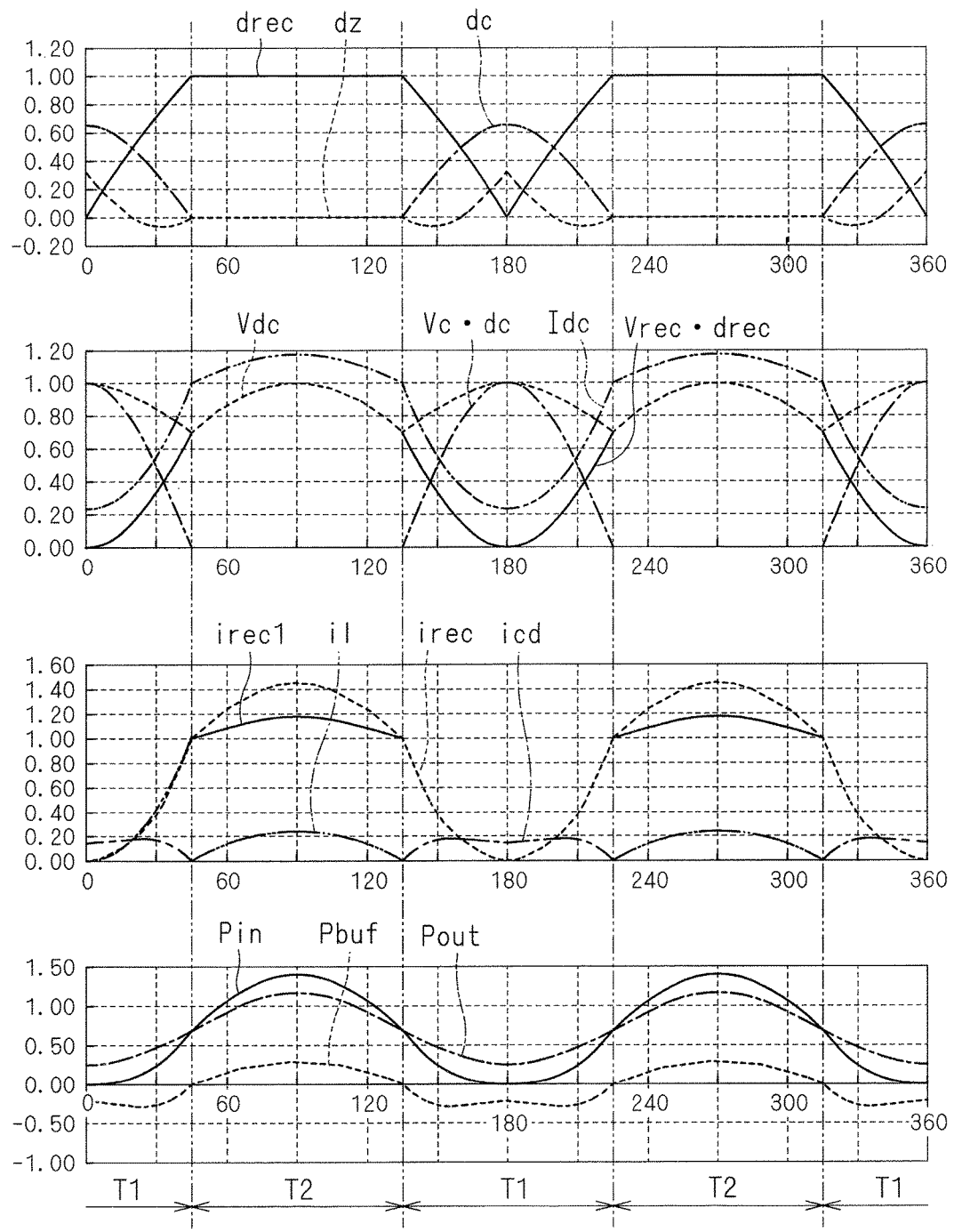

FIGS. 5 and 6 are graphs each showing the operation of the direct power converter shown in FIG. 1, each of which shows the operation when the duties drec, dc and dz are set based on the "second setting". FIG. 5 shows the case where k=1, and FIG. 6 shows the case where k=⅓.

In both of FIGS. 5 and 6, the uppermost tier shows the duties drec, dc and dz, the second tier from the top shows the voltages Vrec·drec and Vc·dc, the virtual DC voltage Vdc which is constituted thereby (see the formula (5)), and the current Idc, the third tier from the top shows the currents irec, icd, il and irec1, and the lowermost tier shows the instantaneous powers Pin, Pout and Pbuf. Symbols T1 and T2 respectively represent the providing period and the receiving period.

In both of FIGS. 5 and 6, the horizontal axis represents the phase angle ωt with "degree" as the unit. The currents Idc, irec, icd, il and irec1 are converted with the crest value Im being $\sqrt{2}$. The voltages Vrec·drec and Vc·dc are converted with the crest value Vm being one. The instantaneous powers Pin, Pout and Pbuf are each obtained as the product of the voltage and current converted as described above. The current il is zero in the providing period T1, and accordingly, the current irec1 matches the current irec; dc=0 in the receiving period T2, and accordingly, the voltage Vrec·drec matches the virtual DC voltage Vdc.

The duties drec, dc and dz do not depend on the constant k as described above, and thus, the virtual DC voltage Vdc and the voltages Vrec·drec and Vc·dc constituting the virtual DC voltage Vdc show the same waveform in FIGS. 5 and 6.

The current Idc, which is expressed by the formula (8), depends on the constant k, and thus differs greatly between the case where k=1 shown in FIG. 5 and the case where k=⅓ shown in FIG. 6.

It is revealed that the current il shown in the third tier from the top in each of FIGS. 5 and 6 is reduced more in the case where k=⅓ than in the case where k=1 (see the formula (22) as well).

The current icd takes a value Idc·dc. The discharge duty dc does not depend on the constant k, and the current Idc depends on the constant k. The current icd accordingly reduces more in the case where k=⅓ shown in FIG. 6 than in the case where k=1 shown in FIG. 5, similarly to the current Idc.

Such reductions in the currents il and icd are desirable from the viewpoints of reducing power capacities required for the reactor L4 and the capacitor C4 employed in the charge and discharge circuit 4, scale and cost.

It is also revealed that the instantaneously provided/received power Pbuf is reduced more, in the case where k=⅓ than in the case where k=1, although the instantaneous input power Pin input is distorted more from the sine wave and the instantaneous output power Pout pulsates.

As shown in FIG. 6, in the case where k=⅓, the virtual DC voltage Vdc is $\sqrt{2}$-times (i.e., a crest value Vm) a value Vm/$\sqrt{2}$ of the virtual DC voltage Vdc in the "first setting" at both of the times when the current Idc has a maximum value and a minimum value.

In the case where k=⅓ in the "second setting" (see FIG. 6), thus, the magnitude of the current Idc at the above times can be reduced to 1/$\sqrt{2}$ times compared with the case where k=⅓ in the "first setting" (see FIG. 4).

The effect of reduced maximum value of the current Idc is particularly desirable from the viewpoint of reduced power ratings of the switching elements Sup, Svp, Swp, Sun, Svn and Swn and the diodes Dup, Dvp, Dwp, Dun, Dvn and Dwn employed in the inverter 5.

(b-4) Example of Technique for Inputting Current Idc to Inverter 5

This section will describe an example for achieving the formula (8) adopted for the current Idc commonly in the "first setting" and the "second setting" regarding duties.

Described below is an example in which well-known dq-axis control is performed as for the operation of a normal AC load. The power formula on the dq axes is typically expressed by the formula (23). Symbols V* and I respectively represent a command value of a voltage applied to the AC load and a current flowing through the AC load. They both are alternating, and thus, dots indicating that they are represented as complex numbers are placed above both of the symbols V* and I. Note that the q-axis voltage ideally follows a command value Vq* thereof, and the d-axis voltage ideally follows a command value Vd* thereof.

$$P+jQ=V^* \cdot I=Vd^* \cdot Id+Vq^* \cdot Iq+j(Vq^* \cdot Id-Vd^* \cdot Iq) \quad (23)$$

The power supplied from the DC power supply lines LH and LL to the inverter 5 has no reactive power, and thus, the power is expressed by the formula (24) ignoring the third term of the formula (23).

$$Pdc=Vd^* \cdot Id+Vq^* \cdot Iq \quad (24)$$

The instantaneous output power Pout expressed by the formula (11) matches the formula (24), so the formula (25) holds.

$$Pdc = Pout = \frac{Vm \cdot Im}{2}(1-(1-k)\cdot \cos(2\omega t)) \quad (25)$$
$$= \frac{Vm \cdot Im}{2} - \frac{(1-k)Vm \cdot Im}{2}\cos(2\omega t)$$

Figure 7:
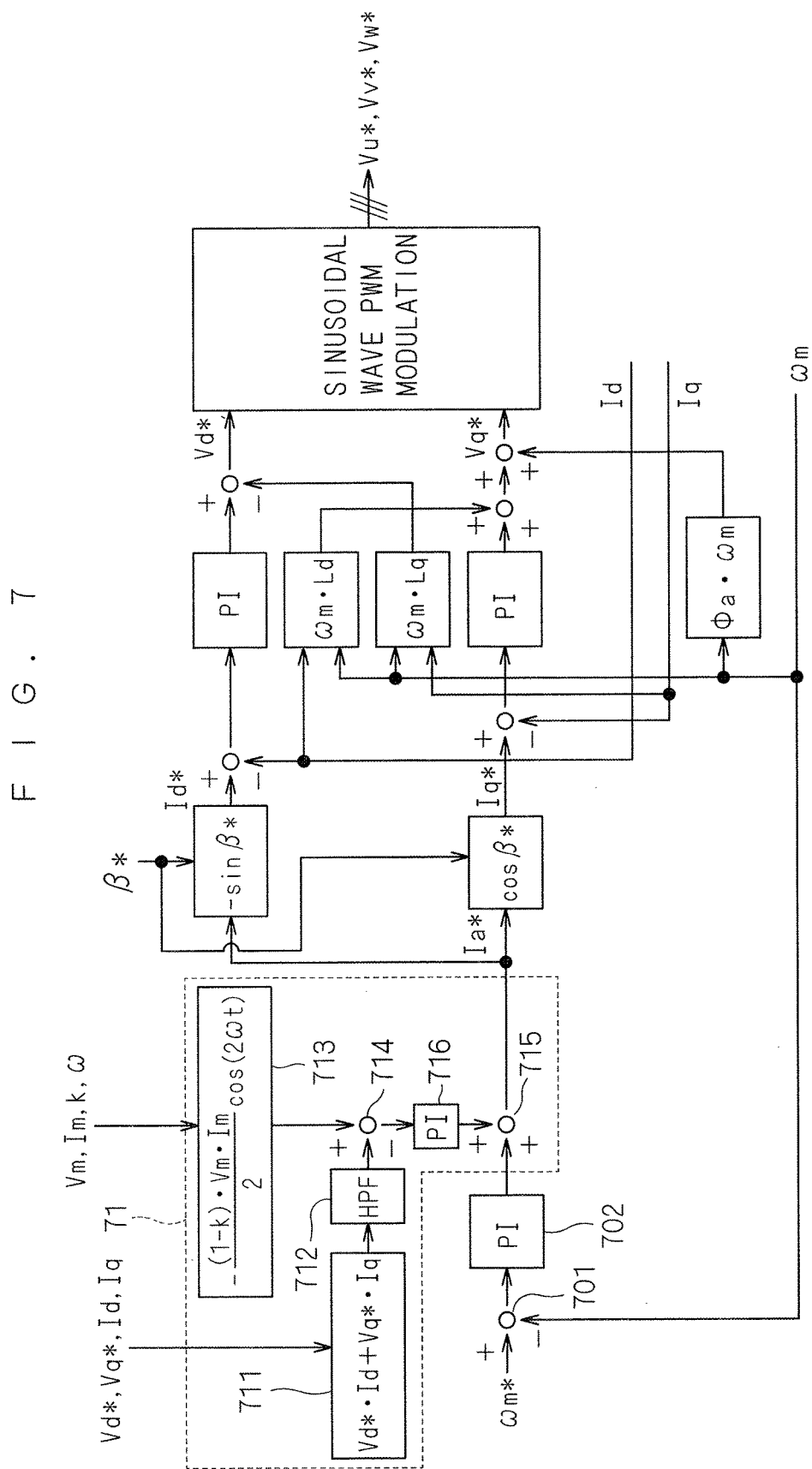
FIG. 7 is a block diagram showing an example configuration for control on a DC current, which is described in the embodiment.

Control to achieve the formula (8) can thus be performed by performing control so that an AC component of the formula (24) and the second term of the rightmost-hand side of the formula (25) match each other. FIG. 7 shows, as a block diagram, an example configuration for performing the control above. The configuration is provided in, for example, the configuration shown as a controller 10 in FIG. 1.

To briefly describe a part of the configuration of FIG. 7 showing a well-known technique, a current phase command value β* is input to obtain trigonometric function values cos β* and −sin β*, from these and a current command value Ia*, a q-axis current command value Iq* and a d-axis current command value Id* are generated. On the assumption that the inductive load 6 is a rotating machine, a q-axis voltage command value Vq* and a d-axis voltage command value Vd* are obtained based on a rotational angular velocity ωm of the rotating machine, a field magnetic flux Φa of the rotating machine, a d-axis inductance Ld and a q-axis inductance Lq of the rotating machine, a q-axis current command value Iq* and a d-axis current command value Id*, and a q-axis current Iq and a d-axis current Id. Voltage command values Vu*, Vv* and Vw* for controlling the inverter 5 are generated from the q-axis voltage command value Vq* and the d-axis voltage command value Vd*.

In the configuration shown in FIG. 1, for example, a velocity detector 9 detects currents Iu, Iv and Iw flowing through the inductive load 6, and based on these, provides the rotational angular velocity ωm, the q-axis current Iq, and the d-axis current Id to the controller 10.

The controller 10 obtains, based on the voltage command values Vu*, Vv* and Vw*, signals SSup, SSvp, SSwp, SSun, SSvn and SSwn (see FIG. 1) for respectively controlling the operations of the switching elements Sup, Svp, Swp, Sun, Svn and Swn of the inverter 5 through arithmetic processing (not shown, e.g., see Japanese Patent Application Laid-Open No. 2011-193678).

The controller 10 also generates signals SSc and SSl that respectively control the operations of the switches Sc and Sl, which are generated based on the duties drec, dc, dz and dl (e.g., see the first document group).

Described below is a processor 71 for performing control so that the AC component of the formula (24) and the second term of the rightmost-hand side of the formula (25) match each other. The processor 71 includes a DC power calculator 711, a pulsating component extractor 712, a pulsating component calculator 713, a subtracter 714, an adder 715 and a PI processor 716.

The DC power calculator 711 receives the q-axis voltage command value Vq* and the d-axis voltage command value Vd*, and the q-axis current Iq and the d-axis current Id, and calculates DC power Pdc based on the formula (24) above, thus providing the DC power Pdc to the pulsating component extractor 712.

The pulsating component extractor 712 extracts and outputs the AC component of the formula (24). The pulsating component extractor 712 is achieved by, for example, a highpass filter HPF.

The pulsating component calculator 713 receives the crest values Vm and Im, the power supply angular velocity ω, and the constant k, thus obtaining the second term of the rightmost-hand side of the formula (25). The crest values Vm and Im and the power supply angular velocity ω can be input to the pulsating component calculator 713 as the information obtained from the single-phase AC power supply 1 (see FIG. 1).

As described above, desired processing is causing the AC component of the formula (24) and the second term of the rightmost-hand side of the formula (25) to match each other, and thus, control should be performed so as to reduce a difference between the output of the pulsating component extractor 712 and the output of the pulsating component calculator 713. The subtracter 714 thus obtains the difference, thus outputting, to the adder 715, a value obtained by the PI processor 716 performing integral proportional control on the difference.

The adder 715 performs processing to correct a current command value Ia* in normal processing by an output of the PI processor 716. Specifically, first, a subtracter 701 obtains a deviation of the rotational angular velocity ωm from a command value ωm* thereof in normal processing to obtain a current command value Ia*. A PI processor 702 performs integral proportional control on the deviation to once obtain the current command value Ia*. The adder 715 then performs processing to increase the current command value Ia* with the output from the PI processor 716.

The known technique above is applied to the current command value Ia* corrected by the processor 71 as described above, thus generating the q-axis voltage command value Vq* and the d-axis voltage command value Vd*. Such control is control to provide feedback regarding the q-axis voltage command value Vq* and the d-axis voltage command value Vd*, and the q-axis current Iq and the d-axis current Id, causing a difference output from the subtracter 714 to be closer to zero. That is to say, such control can cause the AC component of the formula (24) and the second term of the rightmost-hand side of the formula (25) to match each other.

C. Description of Advantages in Charge and Discharge Circuit 4

(c-1) Description of Advantages of Buffer Circuit 4a

This section will describe that reducing the instantaneously provided/received power Pbuf allows the use of an electrolytic capacitor as the capacitor C4, thus achieving the buffer circuit 4a inexpensively.

Figure 8:
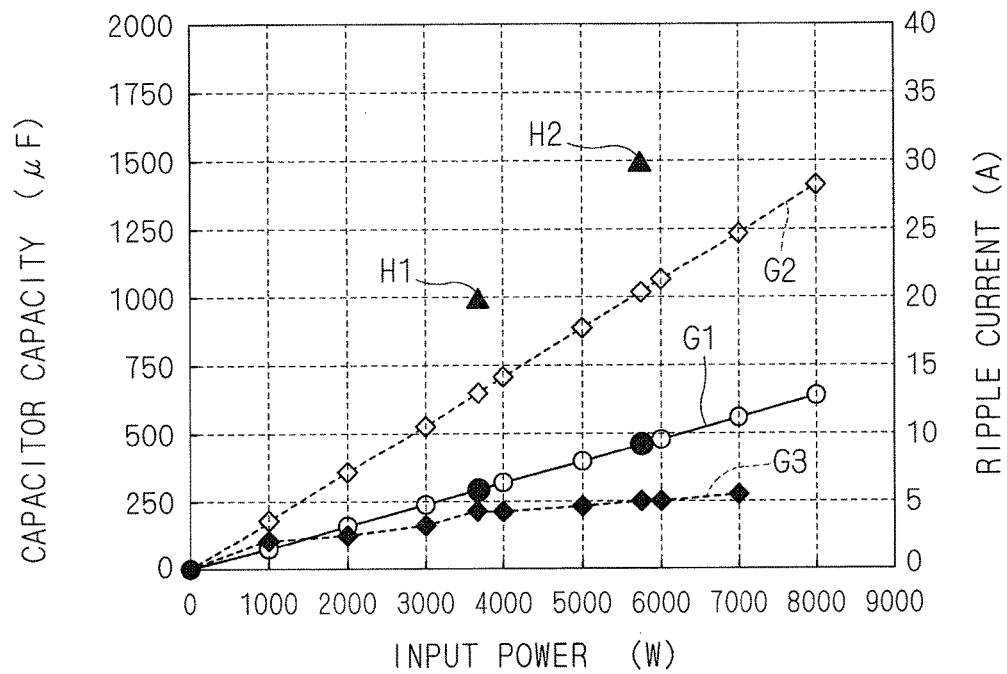
FIG. 8 is a graph showing the relationship among an input power, the electrostatic capacitance of a capacitor and a ripple current in the direct power converter.

FIG. 8 is a graph showing the relationship between the electrostatic capacitance of the electrostatic capacitor (hereinafter referred to as a "capacitor capacity": left vertical axis), used or required in the direct power converter that receives and processes an input power (an average value of the instantaneous input power Pin: horizontal axis) and the ripple current and its allowable value (right vertical axis).

Symbols H1 and H2 each represent the capacitor capacity used in the case where a single-phase power factor correction circuit is used. The symbols H1 and H2 respectively represent data in the case where air conditioners have air conditioning abilities of 6 kW and 11.2 kW. The power factor correction circuit can herein be regarded as having a configuration in which the switch Sc is shorted and removed from the charge and discharge circuit 4, and a connection point between the reactor L4 and the converter 3 is not directly connected with the inverter 5. In this configuration, a series connection of the diode D40 and the reactor L4 is provided between the converter 3 and the inverter 5 in the DC power supply line LH, and the capacitor C4 is connected in parallel with the inverter 5 between the DC power supply lines LH and LL.

According to Yoshiya Ohnuma, Jun-ichi Itoh, "Experimental Verification of Single Phase to Three Phase Converter Using an Active Buffer circuit with a Charge Circuit", 2010 IEEJ Industry Applications Society Conference 1-124 (2010) and Yoshiya Ohnuma, Jun-ichi Itoh, "Comparison of Boost Chopper and Active Buffer as Single to Three Phase Converter", The 2011 Annual Meeting of the Institute of Electrical Engineers of Japan, No. 4-042 (2011), the capacitor capacity C required in the basic technique is obtained by the formula (26). Note that a maximum value Vcmax and a minimum value Vcmin of the both-end voltage Vc are introduced.

$$C = \frac{Vm \cdot Im}{\omega(Vcmax^2 - Vcmin^2)} \quad (26)$$

On a graph G1, values obtained by calculating capacitor capacities required in the basic technique (the case where k=1 in the "first setting") are plotted. Note that maximum value Vcmax=400+50=450 (V) and minimum value Vcmin=400−50=350 (V) hold. Solid circles on the graph G1 indicate the same cases indicated by the symbols H1 and 112 in input power. However, actually used capacitor capacities are plotted as the symbols H1 and H2, and back calculation of them from the formula (26) yields a deviation of approximately ±5% in the both-end voltage Vc.

As can be seen from the comparison between the symbols H1 and H2 and the solid circles on the graph G1, in the basic technique, capacitor capacities are reduced to approximately ⅓ to ¼ times compared with a normal power factor correction circuit.

In the basic technique, however, a ripple current shown by a graph G2 flows through the capacitor C4. A graph G3, meanwhile, shows a ripple current (e.g., values at 45° C. using an electrolytic capacitor of GW-series (105° C. specifications) from Nichicon Corporation) allowable when the capacitor capacity obtained by the graph G1 is obtained by the electrolytic capacitor. The comparison between the graphs G2 and G3 reveals that in the basic technique, the capacitor C4 cannot be achieved by an electrolytic capacitor from the perspective of whether a ripple current is allowable.

In the "first setting" and "second setting" above, however, by introducing a constant k (<1), an amount of pulsations of the power stored in the capacitor C4 can be reduced more than in the basic technique (the case where k=1 in the "first setting"). This achieves the capacitor C4 by an electrolytic capacitor by setting the constant k in accordance with a desired capacitor capacity, contributing to achieving the charge and discharge circuit 4 inexpensively.

(c-2) Description of Advantages in Boost Circuit 4b

This section will describe that the instantaneously provided/received power Pbuf is reduced to achieve the boost circuit 4b inexpensively.

Even the basic technique requires lower power capacity than a normal power factor correction circuit does, which will be described first. From the formula (1), the power passing through a power factor correction circuit is obtained by the formula (27).

$$\frac{Vm \cdot Im}{\pi} \int_0^\pi \frac{1}{2}(1 - \cos 2\theta) d\theta = \frac{Vm \cdot Im}{2} \quad (27)$$

In the basic technique, meanwhile, the power provided to the capacitor C4 via the boost circuit 4b is obtained by the formula (28) based on the formula (2).

$$\frac{Vm \cdot Im}{\pi} \int_{\pi/4}^{3\pi/4} \left(-\frac{1}{2}\cos 2\theta\right) d\theta = \frac{Vm \cdot Im}{2\pi} \quad (28)$$

As revealed from the comparison between the formulas (27) and (28), in the basic technique, the power capacity required for the boost circuit 4b is reduced to 1/n times (approximately ⅓ times) compared with the power factor correction circuit.

Introducing a constant k (<1) in the "first setting" and "second setting" reduces the instantaneously provided/received power Pbuf more than in the basic technique, thus revealing that the power capacity is more reduced.

Even in the basic technique, the peak value of the current il flowing through the reactor L4 is also reduced to ½ times the peak value (which is a crest value Im) in the case of the power factor correction circuit, as expressed by the formula (29).

$$i1 = Im\left(|\sin(\omega t)| - \frac{1}{2|\sin(\omega t)|}\right) \quad (29)$$
$$\leq \frac{Im}{2}(\omega t = \pi/2, 3\pi/2)$$

Introducing the constant k (<1) in the "first setting" and the "second setting" can reduce a current il compared with the basic technique, thus revealing that the power capacity required for the reactor L4 is further reduced in view of the formula (29).

D. Modifications

In the basic technique as well as the technique involving introducing the constant k (<1) in the "first setting" and the "second setting", the filter 2 can also be provided between the converter 3 and the charge and discharge circuit 4.

Figure 9:
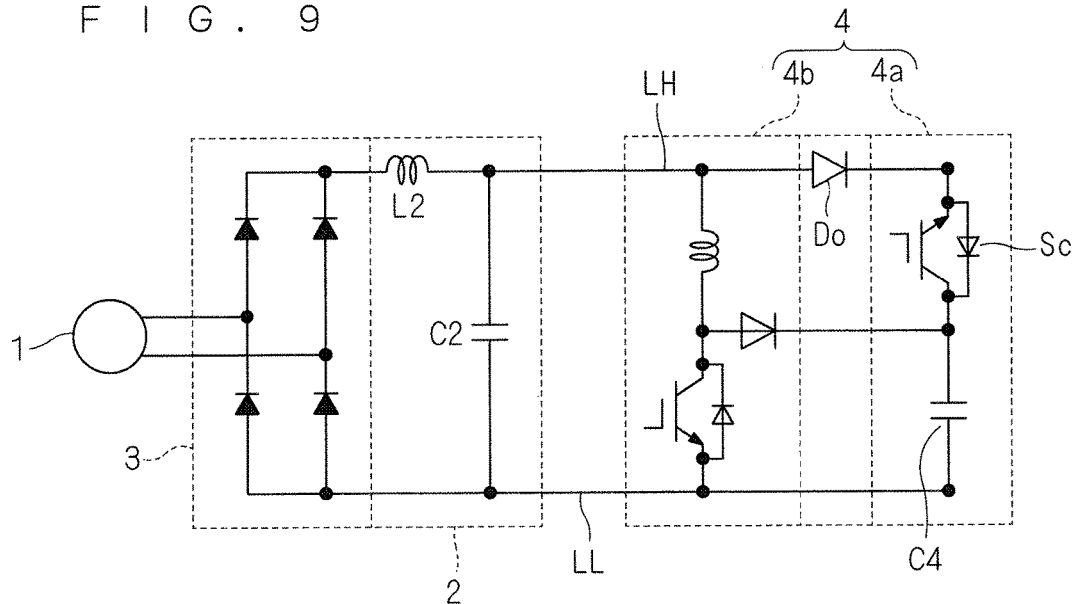
FIG. 9 is a circuit diagram showing a modification of the direct power converter shown in FIG. 1.

FIG. 9 is a circuit diagram in a case where the filter 2 is provided between the converter 3 and the charge and discharge circuit 4, as the modification, showing only the vicinity thereof.

In the adoption of such a configuration, a diode DO is desirably provided between the filter 2 and the buffer circuit 4a in the DC power supply line LH. The anode and cathode of the diode DO are disposed respectively at the filter 2 side and at the the buffer circuit 4a side. The diode DO can prevent the both-end voltage Vc across the capacitor C4 from affecting the both-end voltage across the capacitor C2.

While the disclosure has been shown and described in detail, the foregoing description is in all aspects illustrative and not restrictive. It is therefore regarded that numerous modifications have not illustrated can be devised without departing from the scope of the disclosure.

The invention claimed is:

1. A method for controlling a direct power converter, said direct power converter comprising:
a first power supply line;
a second power supply line which is applied with a potential lower than said first power supply line is applied;
a converter including an input side connected with a single-phase AC power supply and an output side connected with said first power supply line and said second power supply line, and performing single-phase full-wave rectification;
a charge and discharge circuit located between said first power supply line and said second power supply line; and
an inverter that converts a DC voltage between said first power supply line and said second power supply line into an AC voltage,
said charge and discharge circuit comprising
a buffer circuit including a capacitor and a first switch connected in series with said capacitor at a side close to said first power supply line between said first power supply line and said second power supply line, and providing and receiving power between said first power supply line and said second power supply line, and
a boost circuit that boosts a rectified voltage from said converter to charge said capacitor,
said buffer circuit providing power to said first power supply line and said second power supply line in a first period in which a cosine value to a value of twice a phase angle of an AC waveform output from said single-phase AC power supply is positive when the AC waveform is regarded as a sine value of the phase angle; receiving power from said first power supply line and said second power supply line in a second period in which said cosine value is negative,
said converter being conductive at a rectifying duty, said rectifying duty taking a value of $\sqrt{2}$-times an absolute value of said sine value in said first period,
said method comprising a step of:
determining power input to said inverter as a product of an absolute value of an input current input to said converter at a boundary between said first period and said second period, an effective value of an AC voltage of said single-phase AC power supply, and a value obtained by subtracting, from one, a value obtained by multiplying said cosine value by a positive constant less than one.

2. The method for controlling a direct power converter according to claim 1, wherein said rectifying duty takes an inverse number of the value of $\sqrt{2}$-times the absolute value of said sine value in said second period, said method further comprising a step of:
rendering said first switch conductive to discharge said capacitor in said first period at a discharge duty taking a value obtained by dividing, by $\sqrt{2}$, product of said cosine value and a value obtained by dividing a crest value of the AC voltage of said single-phase AC power supply by a both-end voltage of said capacitor.

3. The method for controlling a direct power converter according to claim 1, wherein said rectifying duty takes a value 1 in said second period,
said method further comprising a step of:
rendering said first switch conductive to discharge said capacitor in said first period at a discharge duty taking a product of said cosine value and a value obtained by dividing a crest value of the AC voltage of said single-phase AC power supply by a both-end voltage of said capacitor.

4. The method for controlling a direct power converter according to claim 1, wherein said boost circuit comprises:
a diode including an anode and a cathode that is connected between said first switch and said capacitor;
a reactor connected between said first power supply line and said anode, through which a current input to said boost circuit flows; and
a second switch connected between said second power supply line and said anode, said method further comprising a step of:
controlling said second switch of said boost circuit to control a current flowing through said reactor in said second period.

5. The method for controlling a direct power converter according to claim 2, wherein said boost circuit comprises:
a diode including an anode and a cathode that is connected between said first switch and said capacitor;
a reactor connected between said first power supply line and said anode, through which a current input to said boost circuit flows; and
a second switch connected between said second power supply line and said anode, said method further comprising a step of:
controlling said second switch of said boost circuit to control a current flowing through said reactor in said second period.

6. The method for controlling a direct power converter according to claim 3, wherein said boost circuit comprises:
a diode including an anode and a cathode that is connected between said first switch and said capacitor;
a reactor connected between said first power supply line and said anode, through which a current input to said boost circuit flows; and
a second switch connected between said second power supply line and said anode, said method further comprising a step of:
controlling said second switch of said boost circuit to control a current flowing through said reactor in said second period.

* * * * *